(12) United States Patent
Razzak et al.

(10) Patent No.: US 9,355,303 B2
(45) Date of Patent: May 31, 2016

(54) FACE RECOGNITION USING MULTILAYERED DISCRIMINANT ANALYSIS

(75) Inventors: Muhammad Imran Razzak, Riyadh (SA); Khaled Soliman Alghathbar, Riyadh (SA); Muhammad Khurram Khan, Riyadh (SA)

(73) Assignee: King Saud University, Riyadh (SA)

( * ) Notice: Subject to any disclaimer, the term of this patent is extended or adjusted under 35 U.S.C. 154(b) by 472 days.

(21) Appl. No.: 13/310,763

(22) Filed: Dec. 4, 2011

(65) Prior Publication Data

US 2013/0142399 A1    Jun. 6, 2013

(51) Int. Cl.
*G06K 9/00* (2006.01)
*G06K 9/62* (2006.01)
*G06K 9/68* (2006.01)

(52) U.S. Cl.
CPC .......... *G06K 9/00288* (2013.01); *G06K 9/6234* (2013.01); *G06K 9/6807* (2013.01)

(58) Field of Classification Search
USPC .......................................... 382/118, 160, 225
See application file for complete search history.

(56) References Cited

U.S. PATENT DOCUMENTS

| | | | | |
|---|---|---|---|---|
| 5,842,194 A * | 11/1998 | Arbuckle | .............. | G06K 9/6857 382/224 |
| RE36,041 E * | 1/1999 | Turk | ..................... | A61B 5/1176 382/118 |
| 7,319,779 B1 * | 1/2008 | Mummareddy | ... | G06K 9/00288 382/118 |
| 7,734,087 B2 * | 6/2010 | Hwang | ................. | G06K 9/6235 382/117 |
| 7,876,965 B2 * | 1/2011 | Ai | ...................... | G06K 9/00208 382/118 |
| 8,165,386 B1 * | 4/2012 | Moon | ................ | G06K 9/00973 382/156 |
| 8,311,292 B2 * | 11/2012 | Tian | .................... | G06K 9/00288 382/118 |
| 8,606,022 B2 * | 12/2013 | Yokono | .............. | G06K 9/00375 382/118 |
| 2005/0041863 A1 * | 2/2005 | Ray | ..................... | G06K 9/00281 382/181 |
| 2005/0201595 A1 * | 9/2005 | Kamei | ............... | G06K 9/00275 382/118 |
| 2006/0140455 A1 * | 6/2006 | Costache | .......... | G06F 17/30259 382/118 |
| 2008/0025609 A1 * | 1/2008 | Yashiro | .............. | G06K 9/00248 382/181 |
| 2008/0080748 A1 * | 4/2008 | Sukegawa | .......... | G06K 9/00288 382/118 |

OTHER PUBLICATIONS

Kwak et al, Face Recognition Using Fuzzy Integral and Wavelet Decomposition Method, Aug. 2004, IEEE Transactions on systems, man and sybernetics—part B:: cybernetics col. 24, No. 4, pp. 1666-1675.*

Swets et al, Discriminant Analysis and Eigenspace Partition Tree for Face and Object Recognition from Views, 1996, IEEE, pp. 192-197.*

* cited by examiner

*Primary Examiner* — Kathleen Y Dulaney
(74) *Attorney, Agent, or Firm* — Hauptman Ham, LLP

(57) ABSTRACT

Face recognition using multilayered discriminant analysis includes systems and methods applying an initial linear discriminate analysis to a database of face images in a more-or less conventional manner. Initial fuzzy logic then is applied to the results of the initial linear discriminate analysis to produce a subset of the database of face images. Thereafter, a subsequent linear discriminate analysis is applied to the subset of the database of face images and subsequent fuzzy logic is applied to the results of the subsequent linear discriminate analysis to produce a further subset of the subset of the database of face images. The application of the subsequent linear discriminate analysis and application of the subsequent fuzzy logic may be repeated until the further subset contains only one, or zero, face images.

4 Claims, 3 Drawing Sheets

FACE RECOGNITION USING MULTILAYERED DISCRIMINANT ANALYSIS

BACKGROUND

Face recognition is a branch of pattern recognition, in which human visual perception in terms of face recognition is imitated in a computer. Face recognition has become one of the most important research areas of pattern recognition. In the last few decades, biometrics recognition has been an intensive field of research and consequently, a number of face recognition algorithms have been proposed by computer scientists, neuroscientists, and psychologists. Computer scientists attempt to develop methods for face recognition, whereas psychologists and neuroscientists typically work on the biological process of human face recognition.

Facial recognition is a popular biometric used for investigative, security, and anti-terrorism purposes due to its ease of end-user use and potential ability to identify an individual from distance. Unsupervised statistical methods such as Principal Component Analysis (PCA), Linear Discriminate Analysis (LDA), Direct Linear Discriminate analysis (DLDA), Independent Component Analysis (ICA), Kernel Principal Component Analysis (KPCA), and Support Vector Machines (SVM) are the most popular face recognition algorithms. These algorithms find a set of base images and represent faces as linear combinations of those base images. However, accurate facial recognition involves several challenges. For example, different types of variabilities of facial images in different environments make facial recognition more difficult and existing facial recognition algorithms less accurate. Such variabilities, which make the face recognition more complex, include face illumination, face pose, expression, eyeglasses, makeup, etc. These variabilities have a great influence when dealing with large databases of face images using existing algorithms. As a result, two issues arise in existing face recognition algorithms, feature representation and classification based on features.

Conventional face recognition methods can be classified into two groups, face and constituent. Face-based method (appearance-based technique) uses raw information from face images, i.e., pixels. These methods include PCA-, LDA-, KPCA-, and SVM-based methods, whereas constituent-based approaches use the relationships between face features, i.e., nose, lips, and eyes. Among appearance-based representation, PCA- and LDA-based methods are the two most powerful methods for dimensionality reduction and are successfully applied in many complex classification problems such as speech recognition, face recognition, etc. In general, LDA-based methods perform better than PCA-based methods; but on the other hand, LDA-based methods face problems with Small Sample Size (SSS) and separability criteria. The conventional solution to misclassification for SSS problem and large data set with similar faces is the use of PCA into LDA, typically referred to as "Fisherfaces." PCA is used for dimensionality reduction, and then LDA is performed on to the lower dimensional space. However, the use of LDA over PCA results in loss of significant discriminatory information.

SUMMARY

The described systems and methods relate to computer-implemented face recognition using multilayered discriminant analysis, which includes applying an initial linear discriminate analysis to a database of face images. Initial fuzzy logic then is applied to the results of the initial linear discriminate analysis to produce a subset of the database of face images. Thereafter, a subsequent linear discriminate analysis is applied to the subset of the database of face images and subsequent fuzzy logic is applied to the results of the subsequent linear discriminate analysis to produce a further subset of the subset of the database of face images. The application of the subsequent linear discriminate analysis and application of the subsequent fuzzy logic may be repeated until the further subset contains only one, or zero, face images.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

The systems and methods described herein relate to bio-inspired face recognition using multilayered linear discriminant analysis. The present systems and methods employ a technique of classification that reduces the dataset of facial images to produce better separability criteria using LDA-based methods in a layered manner. This technique is intensive to both Small Sample Size (SSS) and large face variation, due to light or face expression, by optimizing separability criteria.

In contrast to existing techniques that use feature extraction, linear discriminant analysis (LDA) is applied in a layered manner to extract the most similar pattern from a large dataset of facial images, by finding the best projection onto a feature vector. In accordance with various embodiments, fuzzy rules such as based on Euclidian distance may be applied to the LDA results to reduce the dataset to a smaller subset. These steps may then be repeated to further reduce the subset, until an individual image is identified, or all images are eliminated. The present systems and methods decrease False Acceptance Rate (FAR) by reducing the face dataset to very small size through Multilayered Linear Discriminant Analysis (ML-LDA).

Although the computational complexity at recognition time is more than conventional PCA and LDA algorithms, due to computation of weights at run time, the present ML-LDA provides significant performance gains, especially with respect to similar face databases and SSS problems. In particular, ML-LDA is computationally complex as compared to previous methods because creating of new adaptive database and re-computation of feature space is performed at classification time. Secondly, LDA is performed at least twice, and oftentimes, three or more times, at the time of classification. This makes ML-LDA more computational complex, but on the other hand, FAR is minimized to a negligible level by performing the present ML-LDA. However, ever-decreasing computing costs and decreasing prices for computer memory, data storage, and or the like, coupled with the importance of accurate security screening techniques, such as may be facilitated by the present systems and methods, justify such added computational complexity.

Particular examples discussed herein use a multilayer approach to the application of LDA-based techniques to facial recognition. However, the present invention is also applicable on other pattern recognition applications and methods, i.e. PCA-based, IDA-based, DLDA-based, etc.

An Exemplary Procedure for Face Recognition

Figure 1:
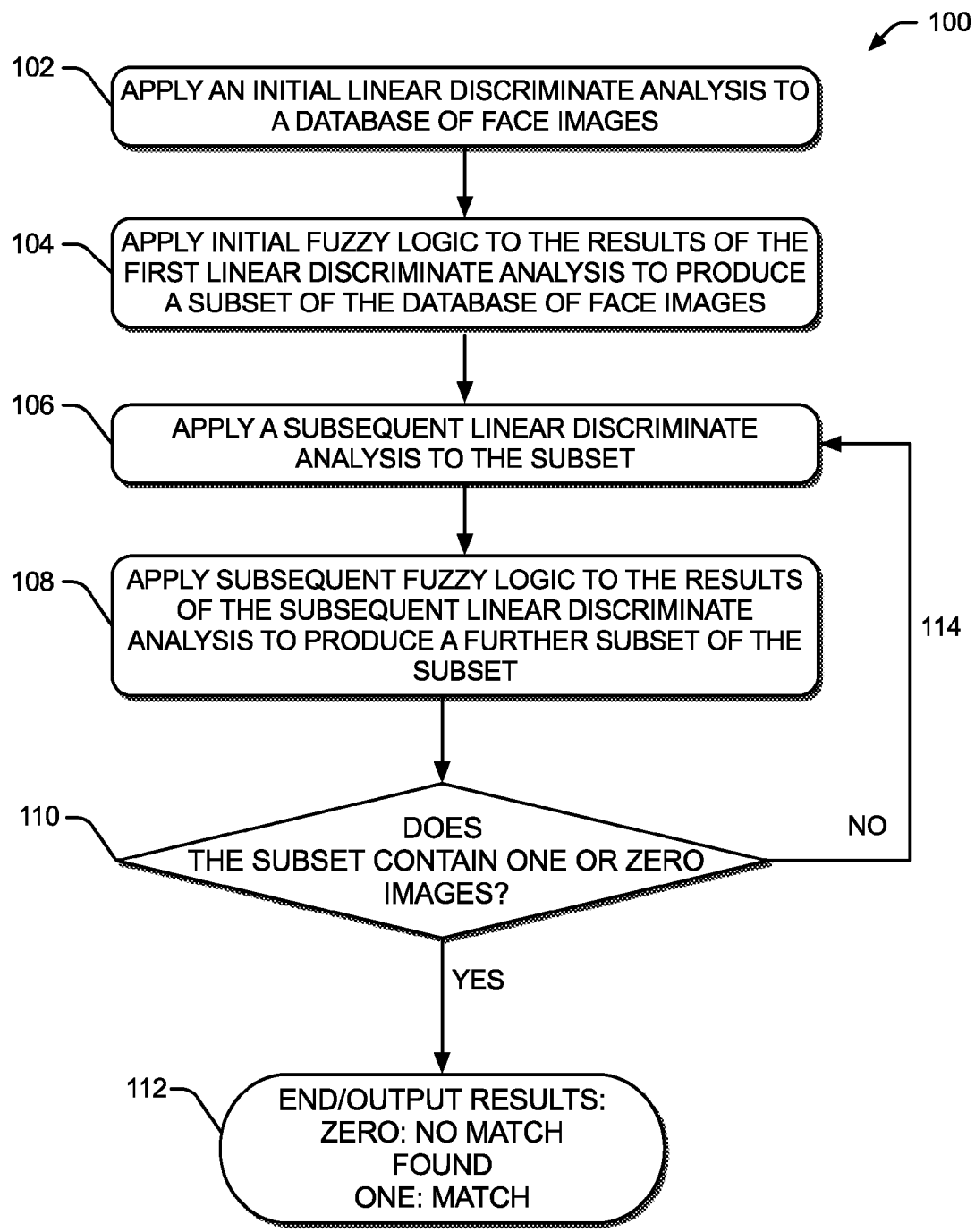
FIG. 1 shows an example procedure for face recognition using multilayered discriminant analysis, according to one embodiment.

FIG. 1 shows example procedure 100 for face recognition using multilayered discriminant analysis according to one embodiment. Therein, an initial linear discriminate analysis is applied to a database of face images at 102. In various embodiments, the linear discriminate analysis applied at 102 might entail calculating between a class scatter matrix and within the class scatter matrix on N classes of faces in a database of n face images, as discussed in greater detail below with respect to FIG. 2.

At 104, fuzzy logic is applied to the results of the first linear discriminate analysis to produce a subset of the database of face images. This application of fuzzy logic at 104 might include finding minimum Euclidean distances for a probe image by projecting the probe image onto the feature space on a number, N of classes, which results in the creation of the new subset database, M, where the size of M is much less than N, as discussed in greater detail below with respect to FIG. 3. Unlike conventional LDA approaches, which select one optimized face as a recognition result, the present process selects several faces from the large initial dataset using LDA to reduce the dataset from N to M. Thus, LDA is used for adaptive classification into subclasses to find the better seperablity criteria on the small dataset instead of the large dataset.

Subsequent linear discriminate analysis is applied to the subset of the database of face images at 106. This layer of application of linear discriminate analysis might entail calculating new feature space on the new database, such as by calculating between the class scatter matrix and within the class scatter matrix on the M classes of faces in the subset database of face images, as discussed in greater detail below with respect to FIG. 4.

At 108, fuzzy logic, similar to the fuzzy logic applied in 104, is applied to the results of the subsequent linear discriminate analysis of 106 to produce a further subset of the subset of the database of face images. Again, the minimum Euclidean distances of the probe image may be found, this time, by projecting the probe image on to the new feature space on M classes. This again results in in the creation of a new subset, this time of database M, which is much smaller than M.

A determination is made at 110 as to whether the application of fuzzy logic at 108 results in a database subset of a single or zero facial images. If not, that is if the subset is greater than one, process 100 again applies the subsequent linear discriminate analysis and application of the subsequent fuzzy logic is repeated (114) until the further resulting subset contains only one face image or zero images at 110. That is, application of subsequent linear discriminate analyses 106 to the further subset of the database of face images is repeated and application of (subsequent) fuzzy logic 108 to the results of repeated subsequent linear discriminate analyses is repeated to produce further, successive subset(s) of the database subset of face images initially produced at 108, until the further subset contains only one, or zero, face images at 110. This repeated analysis might entail repeating creation of a new, successive database at 108, calculation of new feature space on the new database 106, and finding minimum Euclidean distances of the probe image by projecting the probe image on to the new feature space on the classes of the new database at 108, until the new database includes only one, or zero, images at 110.

Output at 112 may take the form of a single image if the probe image is of an individual whose image is in the database of images. In this manner, process 100 may be used to identify an individual that is a subject of a probe image, such as may be useful for identifying criminal or terrorist suspects, or the like. If no image (i.e., zero images) is output at 112, this may be an indication that the subject of the probe image is not in the database. Thus, process 100 may alternatively be used to confirm that an individual who is the subject of a probe image is a member of a dataset (i.e., a database of images of employees, authorized personnel, etc.). In such an implementation, process 100 would either output a single image at 112, confirming that the probe image is of a member of the database, or a "zero" output would indicate that the subject of the probe image is not a member of the database and thus is an imposter or otherwise not an authorized person. Also, it should be noted that in either of the above implementations an output of zero images at 112 may also be an indication that a positive match of the probe image could not be made against the database. This may help prevent false matches and/or false identity confirmations typical in conventional face recognition systems.

Exemplary Procedure for Applying Initial Linear Discriminate Analysis

Figure 2:
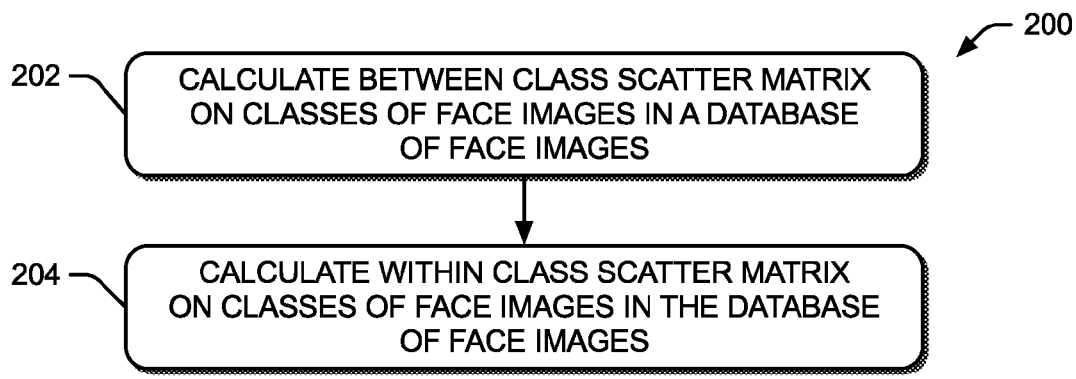
FIG. 2 shows an example process for applying initial linear discriminate analysis to a database of face images, according to one embodiment.

FIG. 2 shows exemplary process 200 for applying initial linear discriminate analysis to a database of face images, according to one embodiment, such as at 102 above. Process 200 comprises calculating between a class scatter matrix on N classes of faces in a database of n face images at 202. At 204, process 200 calculates within the class scatter matrix on N classes of faces in the database of n face images. In the implementation shown in process 200, the optimal projection W may be a matrix that maximizes the determinant between a class scatter matrix and within a class scatter matrix ratio. Such a basis vector for LDA can be denoted as:

$$W = \mathrm{argmax} \frac{|W^T W_{PCA} S_B W_{PCA} W|}{|W^T W_{PCA} S_w W_{PCA} W|}$$

where W=[w1, w2 ... wm] is the set of eigen vector between class scatter matrix SB and within class scatter matrix Sw corresponding to n largest.

The between class scatter matrix is defined as $$S_B = \sum_{i=1}^{c} N_i (\mu_i - \mu)(\mu_i - \mu)^T$$

and the within class scatter matrix is defined as $$S_w = \sum_{i=1}^{C} \sum_{x_k \in X_j} (x_k - \mu_i)(x_k - \mu_i)^T$$

where $\mu_i$ is the $X_i$ class mean and $N_i$ is the number of samples in ith class.

Exemplary Procedure for Applying Fuzzy Logic

Figure 3:
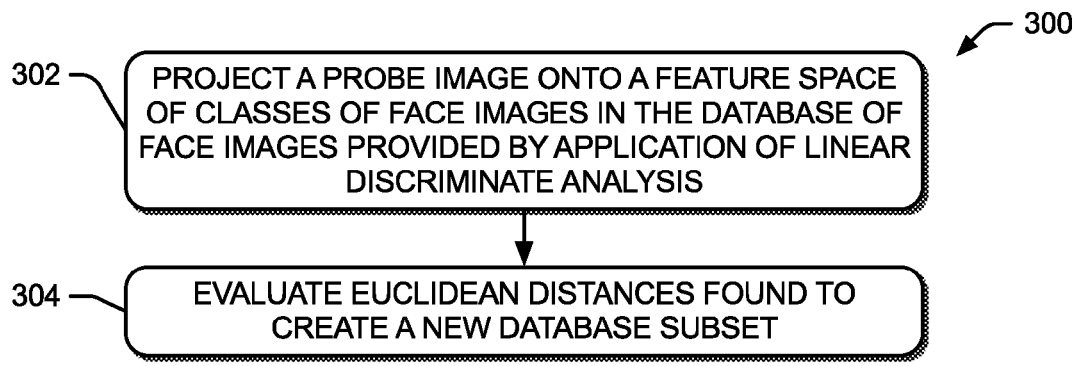
FIG. 3 shows an example process for applying fuzzy logic to the results of linear discriminate analysis, according to one embodiment.

FIG. 3 shows exemplary process 300 for applying fuzzy logic to results of linear discriminate analysis, according to one embodiment, such as applied in steps 104 and/or 108 of process 100 above. In accordance with the implementation illustrated in FIG. 3 minimum Euclidean distances for a probe image are found at 302, such as by projecting the probe image onto the feature space on a number, N of classes. At 304, the Euclidean distances found are evaluated to create a new subset database, M, where the size of M is much less than N. In accordance with one implementation, for N face images in the initial database and every face has ki samples. The total number of samples is give by:

$$K = \sum_{i=1}^{N} k_i$$

If M is the selected classes using linear discriminant analysis based on nearest neighbor approach on probe P, M can be computed as $$\text{Min}[D] = | \text{ if } d_i < \theta$$

$$m_j = N_i(\underset{\theta}{\text{Min}}[D])$$

where $D = \text{Euc\_dist}[d_1, d_2, \ldots d_N]$
and $M = \{m_1, \ldots m_j\}$
where $M \subseteq N$ and $M <<< N$
Thus, this new adaptive dataset consists of K' faces:

$$K' = \sum_{j=1}^{M} K_j.$$

In accordance with this implementation, this new small adaptive subspace LDAN consists of most similar faces of M selected clients as a result of minimum Euclidean distances less than θ by projecting the probe image.

Exemplary Procedure for Applying Subsequent Linear Discriminate Analysis

Figure 4:
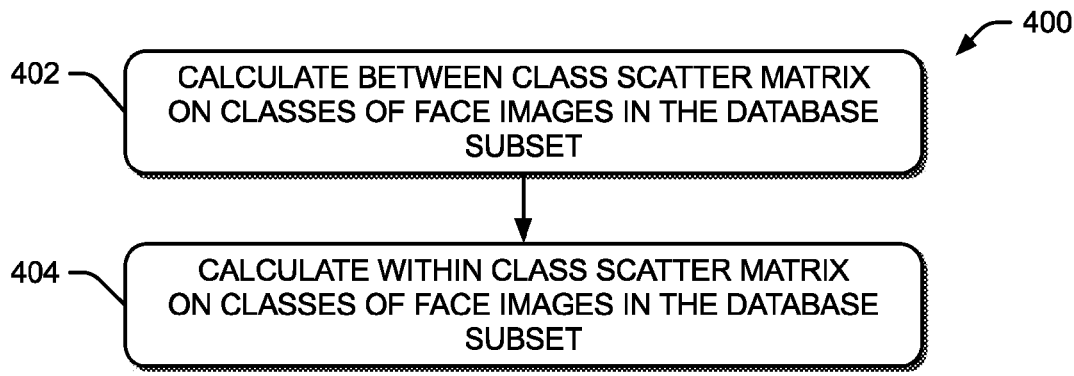
FIG. 4 shows an example process for applying subsequent linear discriminate analysis to a subset of the database of face images, according to one embodiment.

FIG. 4 shows exemplary process 400 for applying subsequent linear discriminate analysis 106 to the subset of the database of face images, according to one embodiment. Process 400 comprises calculating new feature space on the new database, by calculating between the class scatter matrix on the M classes of faces in the subset database of face images at 402 and within the class scatter matrix at 404. In the implementation shown in process 400, between class scatter matrix on the new adaptive database may be computed as:

$$S'_B = \sum_{j=1}^{M} N_j(\mu'_j - \mu')(\mu'_j - \mu')^T$$

similarly within class scatter matrix is calculated as:

$$S'_w = \sum_{j=1}^{M} \sum_{x_k \in X_j} (x_k - \mu'_j)(x_k - \mu'_j)^T$$

$$\mu' = \frac{1}{M'} \sum_{j=1}^{M'} z_j$$

and similarly class mean is:

$$\mu'_j = \frac{1}{K_j} \sum_{j=1}^{Kj} z_j$$

and the optimal projection W' is computed as $$W' = \operatorname{argmax} \frac{|W^T W'_{PCA} S'_B W'_{PCA} W|}{|W^T W'_{PCA} S'_w W'_{PCA} W|}$$

An Exemplary System for Facial Recognition

Figure 5:
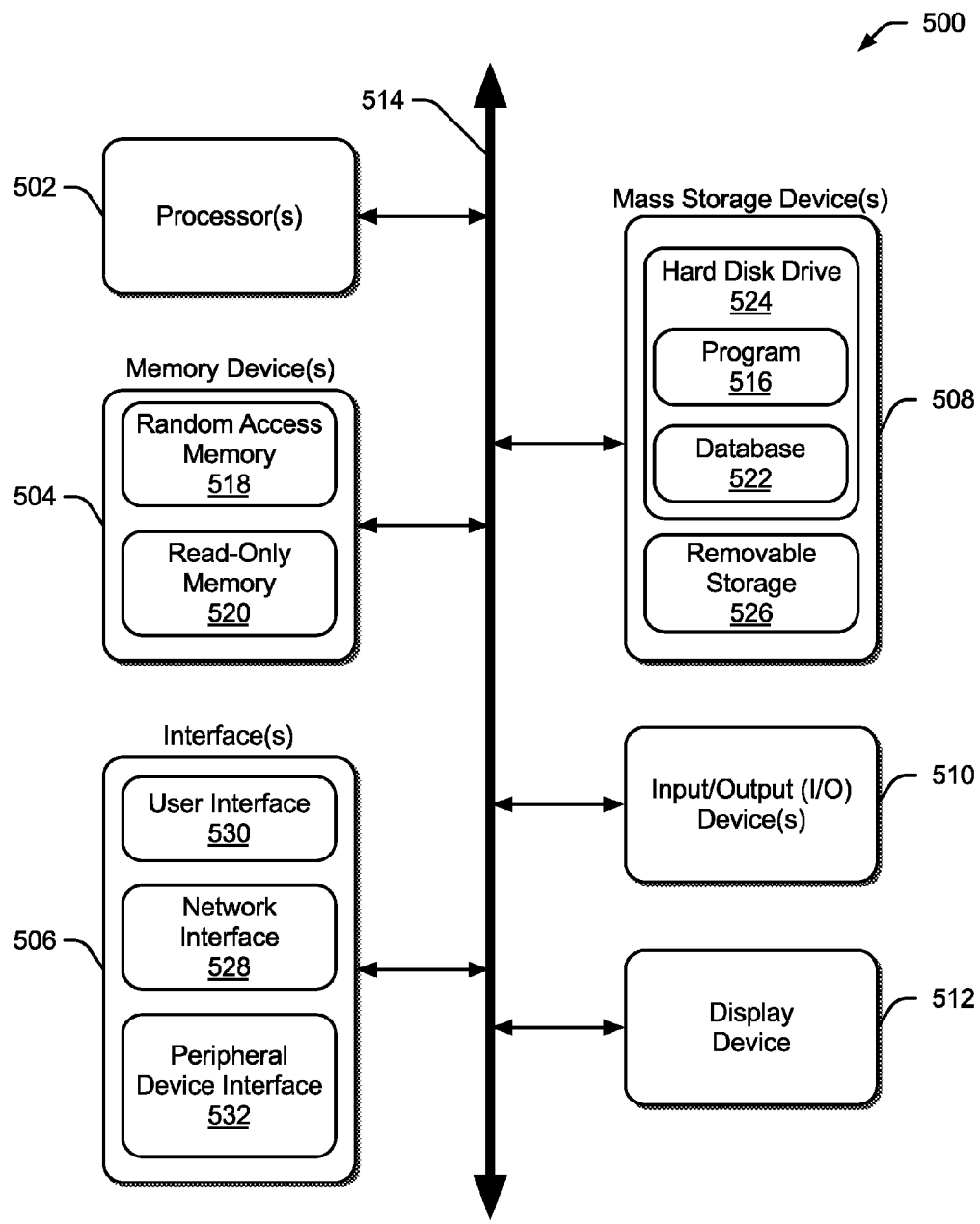
FIG. 5 is a block diagram illustrating an example computing environment capable of implementing the systems and methods described herein, according to one embodiment.

FIG. 5 illustrates an example computing environment capable of implementing the systems and methods described herein, according to one embodiment. Example computing device 500 may be used to perform various procedures, such as those discussed herein, particularly with respect to procedure 100 of FIG. 1. Computing device 500 can function as a server, a client, a worker node, or any other computing entity. Computing device 500 can be any of a wide variety of computing devices, such as a desktop computer, a notebook computer, a server computer, a handheld computer, a work station, and/or the like.

Computing device 500 includes one or more processor(s) 502, one or more memory device(s) 504, one or more interface(s) 506, one or more mass storage device(s) 508, one or more Input/Output (I/O) device(s) 510, and a display device 512 all of which are coupled to a bus 514. Processor(s) 502 include one or more processors or controllers that execute instructions stored in memory device(s) 504 and/or mass storage device(s) 508, such as one or more programs (516) implementing process 100. Processor(s) 502 may also include various types of computer-readable media such as cache memory.

Memory device(s) 504 include various computer-readable media, such as volatile memory (e.g., random access memory (RAM)) 518 and/or nonvolatile memory (e.g., read-only memory (ROM) 520). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. Program 516 implementing process 100 may be stored in such mass storage. Data, such as one or more databases 522 of facial images, such as discussed above, with respect to procedure 100, may also be stored on mass storage device(s) 508. As shown in FIG. 5, a particular mass storage device may be a local hard disk drive 524, which may store program 516 and/or database 522. Various drives may also be included in mass storage device(s) 508 to enable reading from and/or writing to the various computer readable media. Mass storage device(s) 508 include removable media 526 and/or non-removable media and/or remote drives or databases accessible by system 500.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like. For example, a probe image may be input to system 500 via a CCD-based camera or the like for use by system 500 implementing process 100, such as via a request entered into a keyboard by a user of system 500.

Display device 512 optionally is directly coupled to the computing device 500. If display device 512 is not coupled to device 500, such a device is operatively coupled to another device that is operatively coupled to device 500 and accessible by a user of the results of method 100. Display device 512 includes any type of device capable of displaying information to one or more users of computing device 500, such as the results of process 100 at end 112 of the process. Examples of display device 512 include a monitor, display terminal, video projection device, and the like.

Interface(s) 506 include various interfaces that allow computing device 500 to interact with other systems, devices, or computing environments. Example interface(s) 506 include any number of different network interfaces 528, such as interfaces to local area networks (LANs), wide area networks (WANs), wireless networks, and the Internet. Other interfaces include user interface 530 and peripheral device interface 532.

Bus 514 allows processor(s) 502, memory device(s) 504, interface(s) 506, mass storage device(s) 508, and I/O device(s) 510 to communicate with one another, as well as other devices or components coupled to bus 514. Bus 514 represents one or more of several types of bus structures, such as a system bus, PCI bus, IEEE 1394 bus, USB bus, and so forth.

For purposes of illustration, programs and other executable program components, such as program 516, are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Example Case Studies

The Biometric Access Control for Networked and E-commerce Applications (BANCA) face image database, which contains 10 images for each of 40 subjects was used for evaluation of the present process using, by way example, the three case studies discussed below.

Case-I

In "Case-I," Euclidian distance is computed by projecting probe image PI on to the feature space of the whole dataset, which resulted in selection of six faces by using the above-discussed fuzzy logic rules (see Table 1, score for probe PI shown in bold). As a result, the minimum Euclidian distance for probe PI was found to be 0.1488, ranking third in the results. Thus, in accordance with conventional techniques, the recognized face (face with the lowest Euclidian distance, italicized in Table 1) is different from the probe.

However, in accordance with the present systems and methods, the six faces having lowest Euclidian distance are selected to create a new dataset and the feature space is recalculated on this smaller dataset. Again, Euclidian distances are computed by projecting the probe image.

The results, shown in the second row of Table 1, show that by applying LDA on new small dataset, the results are improved; but a recognition result is difficult to achieve due to the small difference in Euclidian distance, particularly between the two closest images (which includes probe PI). Again, if conventional techniques were followed, the result would likely be incorrect. Thus, computation of the Euclidian distance by projecting the probe image again, on a further reduced dataset of the two images having the lowest Euclidian distance, is employed to render the results shown in the third row of Table 1. Therein, the Euclidian distance of the remaining two images is clearly distinguishable. Thereby, probe PI image was recognized in Case-I by applying the LDA three times and reducing the dataset step by step.

TABLE 1

Case-I Euclidian distances, Probe $P_I$ shown in bold, conventional LDA match italicized

| | | | | | | | |
|---|---|---|---|---|---|---|---|
| First Analysis | *0.1488* | 0.2120 | 0.2151 | 0.2729 | 0.3952 | 0.4013 | ... |
| Second Analysis | 0.0218 | 0.0407 | 0.1966 | 0.3755 | 3.7238 | 8.4650 | |
| Third Analysis | 0.0104 | 23.2423 | | | | | |

Case-II

In Case-II, for probe PII, the first row of Table 2 shows the Euclidian distance computed by projecting the probe on to the feature space of the entire BANCA face image database. In this case, the face detected (i.e., the face having the lowest Euclidian distance) is accurate. However, the margin of difference between probe PII and the other images is narrow enough that further analysis is called for. Thus, in accordance with the present systems and methods, six faces having the minimum (and very close to probe image) Euclidian distance are used to create a new dataset.

Euclidian distances again are computed by projecting the probe image in accordance with the present systems and methods. The results in the second row of Table 2 show that by applying LDA on the new small dataset the differentiation between the probe image and the remaining images is improved, but still the margin of difference between probe PII and the other images is still narrow enough that yet further analysis is called for. Hence, a new adaptive dataset is computed resulting in images from the three classes with the lowest Euclidian distances being included. The Euclidian distances in this further reduced dataset are calculated by projecting the probe image again.

The third row of Table 2 shows the Euclidian distance of probe PII is clearly distinguishable from the other two images. Thus, the probe image is again recognized by applying LDA three times and reducing the dataset step by step in accordance with the present systems and methods.

TABLE 2

Case-II Euclidian distances, Probe $P_{II}$ shown in bold, conventional LDA match italicized

| | | | | | | | |
|---|---|---|---|---|---|---|---|
| First Analysis | *0.1266* | 0.1827 | 0.2307 | 0.4028 | 0.4406 | 0.7092 | ... |
| Second Analysis | 0.0340 | 0.0608 | 0.0902 | 0.1108 | 0.7445 | 0.8008 | |
| Third Analysis | 0.0059 | 0.9331 | 4.5685 | | | | |

Case-III

In Case-III, for probe $P_{III}$ the Euclidian distance computed by projecting probe $P_{III}$ on to the feature space of the BANCA face image database is shown in the first line of Table 3. In accordance with the present systems and methods, six faces are selected to create a smaller dataset. In this case, the smaller dataset does not include the probe image. The feature space is then recomputed on this small dataset in accordance with the present systems and methods. Now again, Euclidian distances are computed by projecting the probe image, the results in the second row of Table 3 show that by applying LDA on new small dataset there is still not a clear Euclidian distance between the images. Thus, again a smaller adaptive database is formed as a result of the second LDA and two faces are selected as being closest to the probe image.

The Euclidian distance is recomputed by projecting the probe image again. The third row of Table 3 shows the Euclidian distances of both images are still very close, too close to classify one as the probe image. Thus, this case fails to return a positive match, but avoids returning a False match as existing methods would. For example, conventional LDA-based methods would return the italicized result in the first column of the first row of Table 3 as matching probe $P_{III}$.

TABLE 3

Case-III Euclidian distances, Probe $P_{III}$ shown in bold, conventional LDA match italicized

| | | | | | | | | |
|---|---|---|---|---|---|---|---|---|
| First Analysis | *0.4177* | 0.4291 | 0.4988 | 0.5628 | 0.6342 | 0.71712 | ... | 11.7580 ... |
| Second Analysis | 0.1328 | 0.2393 | 0.2984 | 0.5214 | 0.7492 | 0.8799 | | |
| Third Analysis | 0.0001 | 0.0258 | | | | | | |

Such case studies have shown that the present ML-LDA-based face recognition systems and methods—reduce FAR to approximately 0.0026 and provided accuracy of approximately 96.3% on the BANCA database—provided approximately 93% accuracy and reduce FAR to approximately 0.0034 on the BANCA face database. The presented technique is the multilayered approach, if this approach is applied on the following research, the result can be improved.

CONCLUSION

Although the systems and methods for face recognition using multilayered discriminant analysis have been described in language specific to structural features and/or methodological operations or actions, it is understood that the implementations defined in the appended claims are not necessarily limited to the specific features or actions described. Rather, the specific features and operations of face recognition using multilayered discriminant analysis are disclosed as exemplary forms of implementing the claimed subject matter.

The invention claimed is:

1. A computer-implemented method for face recognition comprising:
   applying an initial linear discriminant analysis to a database of face images;
   applying initial fuzzy logic to the results of the initial linear discriminant analysis to produce a subset of the database of face images;
   applying a subsequent linear discriminant analysis to the subset of the database of face images; and
   applying subsequent fuzzy logic to the results of the subsequent linear discriminant analysis to produce a further subset of the subset of the database of face images; and further comprising:
   repeating application of the subsequent linear discriminant analysis and application of the subsequent fuzzy logic until the further subset contains only one, or zero, face images; and
   repeating application of the subsequent linear discriminant analysis to the further subset of the database of face images and repeating application of the subsequent fuzzy logic to the results of repeated subsequent linear discriminant analysis to produce successive subsets of the further subset of the database of face images until a successive subset contains only one, or zero, face images; and
   wherein applying the initial linear discriminant analysis to a database of face images comprises calculating between class scatter matrix and within class scatter matrix on classes of face images in the database of face images; and
   wherein applying initial fuzzy logic to the results of the initial linear discriminant analysis comprises finding minimum Euclidean distances of a probe image by projecting the probe image onto a feature space of classes of face images in the database of face images provided by application of the initial linear discriminant analysis and wherein the initial linear discriminant analysis is repeated three times.

2. The computer-implemented method as recited in claim 1 wherein:
   production of the subset of the database of face images results in the subset being much smaller than the database and the subset comprising at least two images from the database;
   applying the subsequent linear discriminant analysis to the subset of the database of face images comprises calculating a new feature space on the subset of the database by calculating between class scatter matrix and within class scatter matrix on classes of face images in the subset; and
   applying subsequent fuzzy logic to the results of the subsequent linear discriminant analysis to produce a further subset of the subset of the database of face images comprises finding minimum Euclidean distances of the probe image by projecting the probe image on to the new feature space of the subset.

3. The computer-implemented method as recited in claim 2, further comprising:
   production of the successive subsets the database, calculation of a new feature space on the successive subsets, and finding minimum Euclidean distances of the probe image by projecting the probe image on to the new feature space on the classes of the successive subsets until a successive subset includes only one, or zero, images.

4. The computer-implemented method as recited in claim 1 wherein the database of face images includes classes of images of face images for each subject in the database.

\* \* \* \* \*